July 8, 1969          H. METH          3,453,991

APPARATUS FOR FORMING ARTISTIC PATTERNS

Original Filed Dec. 7, 1966          Sheet 1 of 3

*INVENTOR.*
HARRY METH

BY Kinney & Schenk.
ATTORNEYS

July 8, 1969  H. METH  3,453,991
APPARATUS FOR FORMING ARTISTIC PATTERNS
Original Filed Dec. 7, 1966  Sheet 3 of 3

*INVENTOR.*
HARRY METH
BY *Kinney & Schenk.*
ATTORNEYS

United States Patent Office 3,453,991
Patented July 8, 1969

1

3,453,991
APPARATUS FOR FORMING ARTISTIC PATTERNS
Harry Meth, Cincinnati, Ohio, assignor to Rainbow Crafts, Inc., a corporation of Delaware
Continuation of application Ser. No. 599,951, Dec. 7, 1966. This application Feb. 14, 1968, Ser. No. 705,861
Int. Cl. B05c 11/02
U.S. Cl. 118—102                                    9 Claims

ABSTRACT OF THE DISCLOSURE

A receptacle including slot means formed at the joinder of the receptacle base and the upstanding wall thereof whereby a card adapted to receive color matter therein may be retained within the receptacle and disc means adapted to be inserted into said receptacle for cooperation with the color bearing card surface and having a handle element whereby said disc may be manipulated to smear said color matter to effect a design pattern on the card surface.

Cross-reference to related application

This is a continuation of application Serial No. 599,951, filed December 7, 1966, and now abandoned.

This invention relates to an apparatus for forming artistic patterns and, more particularly, to an apparatus for forming artistic patterns on a non-absorbent surface by color paints.

The forming of artistic patterns of varying designs is especially appealing to young children. Thus, a child may be easily amused by a device in which the child can form varying types of design patterns.

One previously suggested aparatus for forming artistic patterns of varying designs has been to use a device in which a motor spins or turns a board. Squeezing of a color on the board during its spinning or turning results in the color spreading out due to centrifugal force created by the rotating board. However, this type of structure for forming an artistic design creates several problems.

One of these is the danger from the rotating board. This is particularly true with respect to young children, who may have their fingers caught or hit by the board. Thus, this limits the use of the toy to children of an older age whereas the formation of accidental design patterns is particularly appealing to young children.

Another problem with the type of apparatus in which a board is spun or turned by a motor is that the patterns are formed so rapidly that the child does not have the opportunity to determine the type of pattern that the wishes. Thus, the child is not able to control the forming of the pattern to the extent normally desired by the child in order for the toy to be enjoyed by the child.

Still another problem with the type of device in which a motor spins or rotates a board is the relatively high cost. Thus, it is a relatively expensive toy so that its use is rather limited.

The present invention satisfactorily overcomes the foregoing problems by utilizing a relatively low cost device. The device allows the child to rotate one of the members with respect to the other by hand to form a pattern thereon. Thus, the formation of the pattern is under the control of the child, and there is no danger of the child's fingers being hurt by any motor driven board.

A primary object of this invention is to provide a method and a relatively low cost apparatus for forming artistic patterns of varying designs.

Other objects, uses, and advantages of this invention are apparent upon a reading of this description, which proceeds with reference to the drawings forming part thereof and wherein:

2

Figure 1:
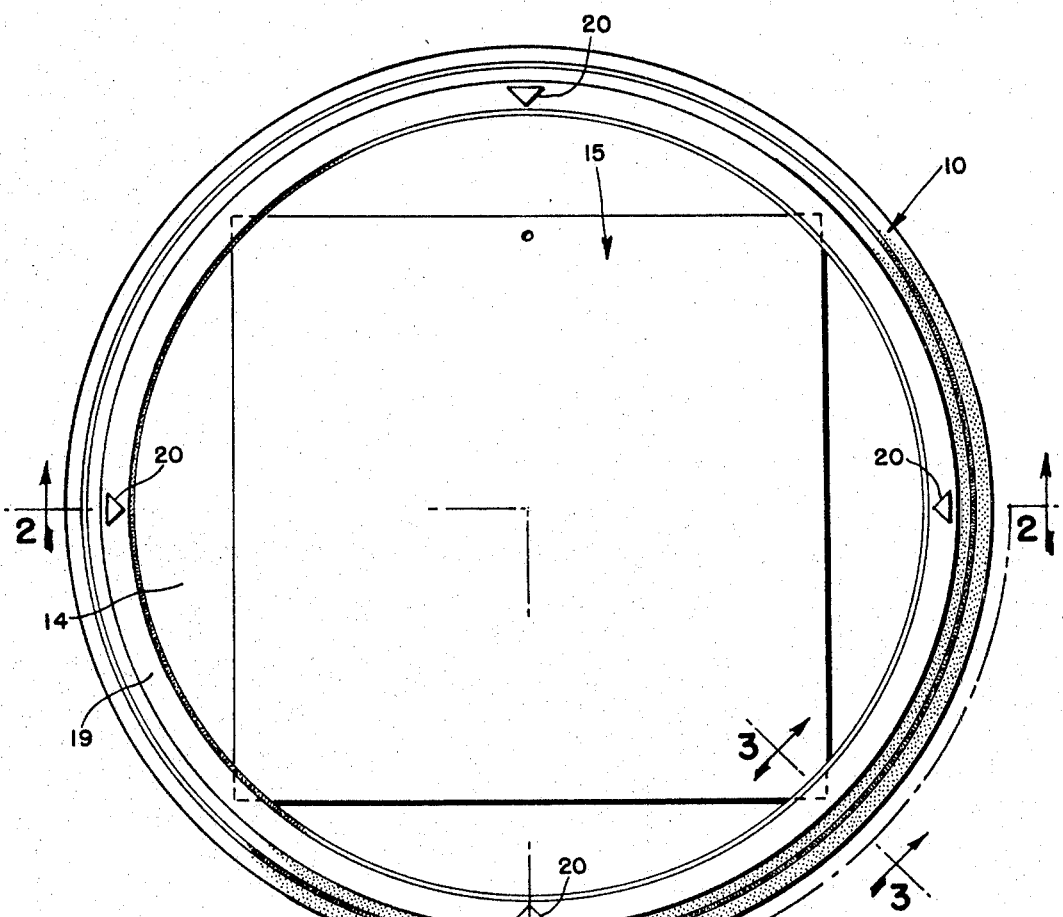
FIGURE 1 is a top plan view of one portion of the apparatus of the present invention.
Figure 2:
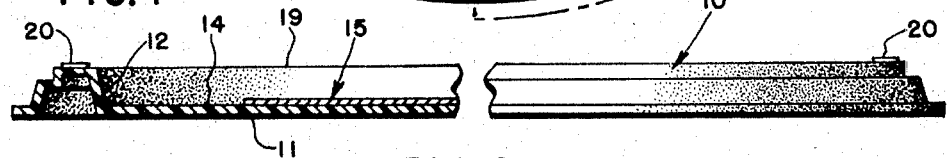
FIGURE 2 is a sectional view, partly in elevation of the structure of FIGURE 1 and taken along the line 2—2 of FIGURE 1.
Figure 3:
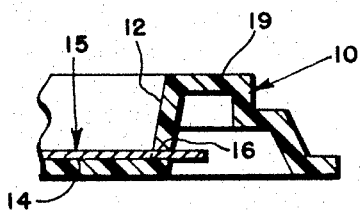
FIGURE 3 is an enlarged sectional view of a portion of the structure of FIGURE 1 and taken along the line 3—3 of FIGURE 1.

Referring to FIGURES 1 to 3, there is shown a support member or tray 10 including a base or bottom 11 and a wall 12, which extends upwardly from the bottom 11. The bottom 11 and the upwardly extending wall 12 cooperate to define a receptacle or recess 14 within the support member or tray 10. Both the receptacle 14 and the tray 10 are preferably circular in shape.

As shown in FIGURES 1 to 3, a member 15 is disposed within the recess or receptacle 14 of the support member 10 and has its bottom surface resting on the bottom 11 of the support member 10. The member 15, which is polygonal in shape and preferably square shaped, has its four corners disposed within slots 16 (see FIGURE 3), which are formed in the upwardly extending wall 12 of the support member 10 adjacent the intersection of the wall 12 with the bottom 11. Thus, the member 15 is removably attached to the support member 10 whereby the member 15 is retained in position.

Figure 4:
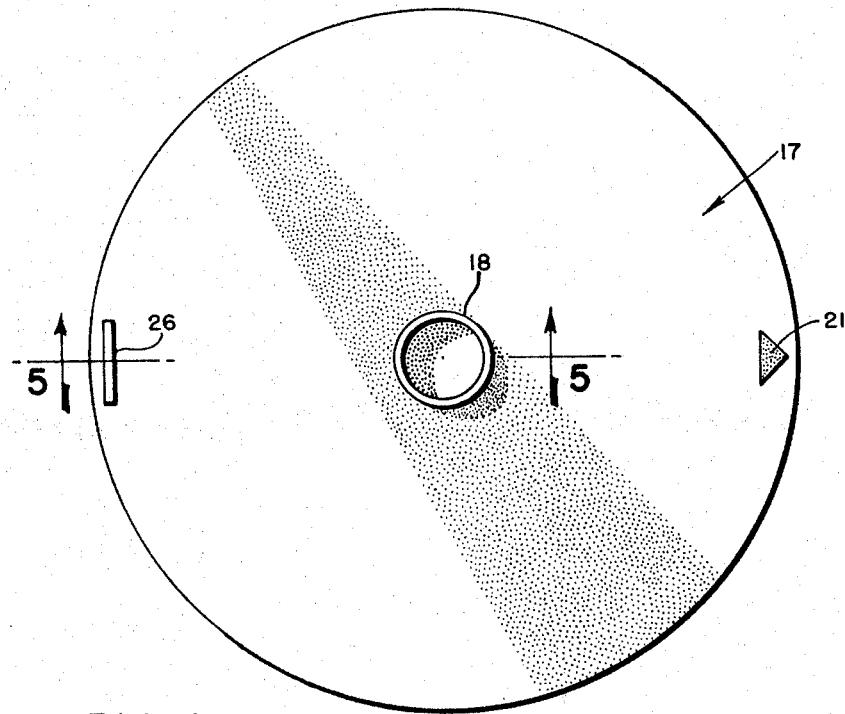
FIGURE 4 is a top plan view of the other portion of the apparatus of the present invention.
Figure 5:
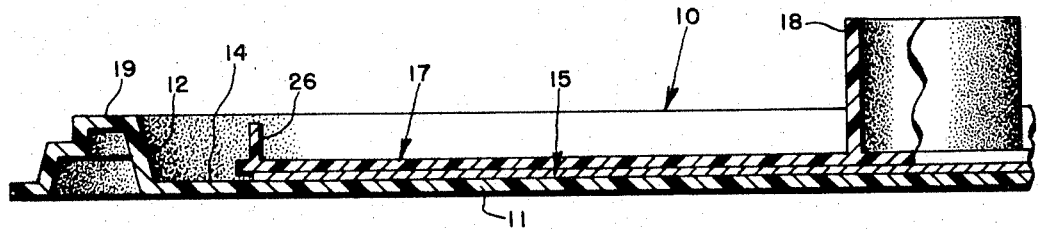
FIGURE 5 is an enlarged sectional view showing the structure of FIGURE 4 disposed within the structure of FIGURE 1 and taken along the line 5—5 of FIGURE 4 and the left part of line 2—2 of FIGURE 1.

A member 17 (see FIGURE 4), which is preferably circular in shape but of smaller diameter than the diameter of the recess 14 of the support member 10, is adapted to be disposed on top of the member 15 as shown in FIGURE 5. The member 17 has a handle 18, which is preferably formed integral therewith, disposed in the center of the member 17 for turning the member 17. If desired, the handle 18 could be disposed along the periphery of the member 17.

The member 15 has at least its upper surface, which engages the bottom surface of the member 17, formed of a non-absorbent material. Similarly, at least the lower surface of the member 17 is formed of non-absorbent material. While it is only necessary that the contacting surfaces of the members 15 and 17 be non-absorbent, the members 15 and 17 are preferably formed of non-absorbent material for economical purposes. Suitable examples of a non-absorbent material for forming the members 15 and 17 include cardboard, which has been coated with polyethylene, and a sheet of polyethylene.

Furthermore, the member 15 is preferably formed rigid while the member 17 is preferably formed flexible. However, both of the members 15 and 17 could be rigid or both could be flexible if desired. It is only necessary that they be capable of being moved into and away from engagement with each other.

An upper wall 19 of the support member or tray 10 has indicating marks 20 embossed thereon. The marks 20 are equally angularly spaced about the upper wall 19 as shown in FIGURE 1. The top member 17 has an indicating mark 21 (see FIGURE 4) along its periphery. Accordingly, the mark 21 may be utilized with the marks 20 on the support member or tray 10 to determine the relative position of the member 17 with respect to the member 15, which is removably attached to the tray 10.

Figure 6:
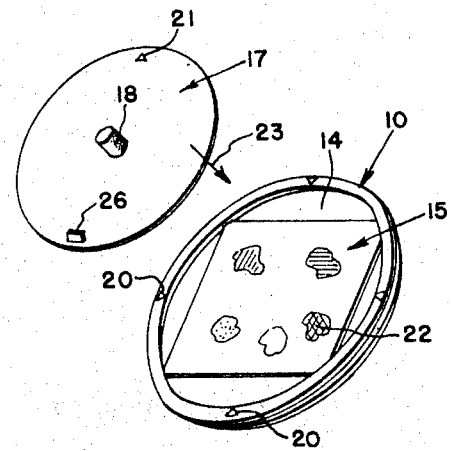
FIGURE 6 is a perspective view of the structure of FIGURES 1 and 4 and shows the first step in forming an artistic pattern by the apparatus of the present invention.

Referring to FIGURE 6, the member 15 is shown with a plurality of splashes 22 of paint on its non-absorbent surface. The paint has a wetting agent that insures that it adheres and spreads on non-absorbent surfaces. Furthermore, the paint is removable from the non-absorbent surfaces by washing or wetting the paint.

Figure 7:
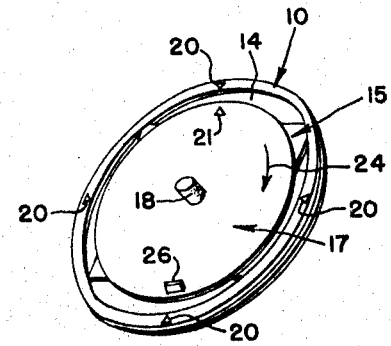
FIGURE 7 is a perspective view of the structures of FIGURES 1 and 4 and shows the second step in forming the artistic pattern.

After the splashes 22 of paint have been disposed on the upper non-absorbent surface of the member 15 in any spaced arrangement, either predetermined or at random, the member 17, which functions as an applicator, is moved downwardly as indicated by an arrow 23 so that its non-absorbent lower surface moves into contact with the non-absorbent upper surface of the member 15. When this occurs, some of the paint in the splashes 22 adheres to the lower surface of the member 17. Furthermore, with the member 17 in engagement with the member 15 as shown in FIGURE 7, the member 17 is rotated clockwise through 90° as indicated by an arrow 24.

Figure 9:
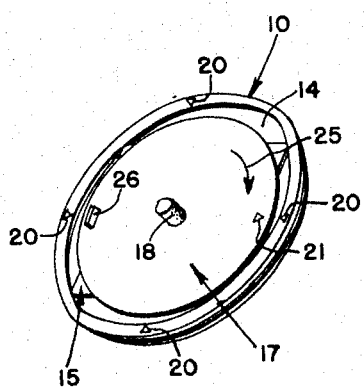
FIGURE 9 is a perspective view of the structures of FIGURES 1 and 4 and shows the fourth step in forming the artistic pattern.

Thereafter, the member 17 is lifted from the member 15 and out of the recess 14 of the support member or tray 10. The member 17 may then be again moved down into engagement with the member 15 as shown in FIGURE 9. At this time, the indicating mark 21 will be aligned with another of the indicating marks 20 on the tray 10 because of the rotation through 90° of the member 17 when it was in the position of FIGURE 7.

The indicating marks 20 and 21 are employed to insure that the member 17 is returned to the position in which it was disposed when the previous rotation of the member 17 with respect to the member 15 ceased prior to removing the member 17 from engagement with the member 15. Again, another rotation of 90° clockwise, as indicated by an arrow 25, will further vary the design of the artistic pattern on the member 15.

This operation of moving the member 17 into engagement with the member 15 and then rotating the member 17 with respect to the member 15 is continued until a desired design is obtained. Thus, the user may easily decide when a desired artistic pattern has been obtained.

Figure 8:
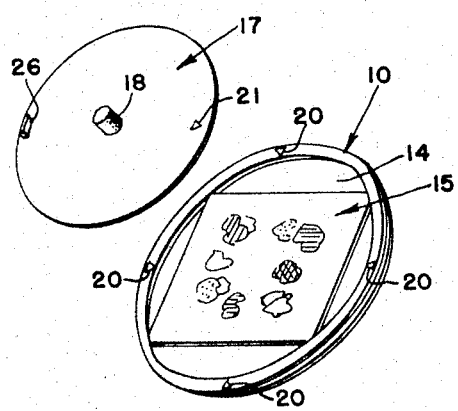
FIGURE 8 is a perspective view of the structures of FIGURES 1 and 4 and shows the third step in forming the artistic pattern.

Furthermore, it should be understood that rotation of the member 17 with respect to the member 15 could be accomplished when the member 17 is removed from engagement with the member 15 rather than when the members 15 and 17 are in engagement with each other. In this arrangement or method of forming a pattern, the member 17 would merely engage the member 15 in the position of FIGURE 7 but there would be no rotation at this time. However, when the members 15 and 17 were disposed in the position of FIGURE 8, the member 17 would be rotated clockwise sufficiently to insure that the indicating mark 21 would align with the next of the marks 20 when the member 17 again engaged the member 15.

Furthermore, there could be rotation of the member 17 with respect to the member 15 both during the time that the non-absorbent surfaces of the members 15 and 17 are in contact with each other and during the time when the member 17 is removed from contact with the member 15. Thus, there could be 90° of rotation of the member 17 in FIGURE 7, another 90° of relative rotation between the members 15 and 17 when in the position of FIGURE 8, and another 90° of rotation of the members 15 and 17 when in the position of FIGURE 9. Of course, in this last method of moving the members 15 and 17 with respect to each other, the indicating mark 21 on the member 17 would not be aligned with the indicating mark 20 on the tray 10 as shown in FIGURE 9 but would be aligned with the mark 20, which is 90° clockwise from the mark 20 now aligned with the mark 21 in FIGURE 9.

When the members 15 and 17 are pulled apart from each other, a veining effect occurs in the artistic pattern being formed. The pulling apart of the members 15 and 17 also blends the colors of the splashes 22 of the paint.

The width of the veins is dependent upon the wetness of the paint. That is, finer veins are created from using relatively dry paint while wider veins are created from using relatively wet paint.

While any number of different colors of paint may be utilized as the splashes 22, it has been found that the colors of red, yellow, and blue are sufficient to produce most any desired blends of colors and patterns. Of course, other colors could be employed if desired.

While the handle 18, which enables rotation of the member 17 with respect to the member 15, could be employed to pull the member 17 away from the member 15 after the members 15 and 17 have been moved into contact or engagement with each other, this type of movement creates too much suction. Accordingly, a removal tab 26 is disposed along the periphery of the member 17 to aid in easier removal of the member 17 from the member 15 when there is wet paint on the member 15.

It is not necessary for the member 17 to have its non-absorbent surface cleaned after each formation of a pattern on the member 15. Of course, it is desirable to normally use a new one of the members 15 for each pattern formation. Thus, the easy insertion of the corners of the member 15 within the slots 16 of the tray 10 permits quick and easy removal and insertion of the members 15.

While the member 17 has been shown as circular in shape and the member 15 polygonal, it should be understood that the member 17 could have the same shape as the member 15. Thus, both could be polygonal or both could be circular in shape.

The tray or support member 10 could be eliminated. However, in this arrangement, it would be necessary to grasp one or more of the corners of the member 15 to permit separation of the members 15 and 17 from each other.

It should be understood that the member 15 could be eliminated if desired. In this arrangement, the member 17 would be moved into and away from engagement with the upper surface of the bottom 11 of the tray 10. Of course, it would be necessary that at least the upper surface of the bottom 11 of the tray 10 be formed of a non-absorbent material since this would have the artistic pattern formed thereon.

By forming the recess 14 of a greater depth than the combined thicknesses of the members 15 and 17, any paint, which might be squeezed from between the members 15 and 17, is easily retained within the recess 14 of the tray 10. Thus, there is no danger of the paint escaping onto a floor, carpet, or other furniture, for example.

While the member 17 has been described as being rotated 90° with respect to the member 15 during each rotation of the member 17, it should be understood that any other amount of rotation such as 180°, for example, could be utilized. Likewise, the distance between the marks 20 on the tray 10 could be changed to smaller or greater distances as long as they were equally angularly spaced from each other. Furthermore, while the tray 10 has been shown as having a plurality of the equally angularly spaced marks 20 and the member 17 with only the single mark 21, it should be understood that the member 17 could have a plurality of equally angularly spaced marks and the tray 10 have only a single indicating mark if desired.

Although the artistic patterns have been described as being formed by a predetermined amount of rotation between the members 15 and 17, it should be understood that random turning would be primarily employed. Thus, rotation could be in either direction and be quite limited, for example. With this type of random turning and blotting, the marks 20 and the single mark 21 could be eliminated if desired.

The tray 10 is formed of a non-breakable material such as high density styrene or polyethylene, for example. Of course, any other suitable material may be employed as long as it provides stiffness and is non-breakable.

An advantage of this invention is that it may be safely used by young children. Another advantage of this invention is that it is relatively inexpensive in cost to manufacture. A further advantage of this invention is that artistic patterns of varying design are easily formed.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

Now, therefore, I claim:

1. A device for forming an artistic pattern comprising a support member having a base and an edge wall portion which extends upwardly from said base so as to form a shallow receptacle, said wall having at least one horizontal slot therein at substantially its joinder with the base of the support member, a plate member having a surface upon which the artistic pattern is to be formed, said plate member being of such size and shape whereby one edge thereof is adapted to be inserted in the horizontal slot so as to retain said plate member within the receptacle, a disk member adapted to be disposed within the receptacle so that one of its surfaces is superimposed over said plate member, and means secured to said disk member for moving it with respect to said plate member so that paint applied to at least one of said plate and disk members will be engaged between the faces of said members and spread into said pattern in response to movement of said disk member with respect to said plate member.

2. The combination of claim 1 wherein a plurality of horizontally aligned slots are spaced around the wall portion for engaging the plate member.

3. The combination of claim 2 wherein the receptacle is circular in shape, the plate member is polygonal in shape, and the disk member is circular in shape, the diameter of said disk member being smaller than the diameter of the receptacle, and the corners of said polygonally shaped member are engaged by slots in the support member.

4. The combination of claim 1 wherein the surface of the plate member upon which the pattern is to be formed and said one surface of the disc member are formed of a non-absorbent material.

5. The combination of claim 1 wherein said means includes an upwardly extending handle for grasping the disk member and moving it relative to the plate member.

6. The combination of claim 1 wherein at least one indicating mark is provided on the upwardly extending wall portion of the support member and the movable disk member.

7. The combination of claim 6 wherein a plurality of indicating marks are equally angularly spaced on at least one of the members.

8. The combination of claim 1 wherein the plate member is substantially rigid, and said disk member is substantially flexible.

9. A device for forming an artistic pattern comprising a tray-shaped support member, a plate member having a surface upon which the artistic pattern is to be formed, the size and shape of said plate member being such that it fits within the tray-shaped support member, slot means integral with the support member for retaining said plate member within the support member in a prescribed position, a disk member disposed within the support member on top of said plate member, and means for moving said disk member with respect to the plate member.

References Cited

UNITED STATES PATENTS

| | | | |
|---|---|---|---|
| 21,896 | 10/1858 | Miles | 117—10 |
| 1,131,579 | 3/1915 | Wallace. | |
| 2,256,995 | 9/1941 | Andres | 206—65 |
| 2,412,306 | 12/1946 | Stoll. | |
| 2,557,348 | 6/1951 | Hornbostel | 118—506 |
| 2,655,898 | 10/1953 | McNeil | 118—506 |
| 3,323,491 | 6/1967 | Granick | 118—506 |

FOREIGN PATENTS 343,742  2/1931  Great Britain.

OTHER REFERENCES

Chester Gould, "Dick Tracy," The Washington Post, Washington, D.C., June 25, 1963, p. B19.

MORRIS KAPLAN, *Primary Examiner.*

U.S. Cl. X.R.

35—26; 118—503, 506